United States Patent
Mitchell et al.

(10) Patent No.: US 7,665,956 B2
(45) Date of Patent: Feb. 23, 2010

(54) WALL COOLING ARRANGEMENT

(75) Inventors: Mark T Mitchell, Bristol (GB); Peter Ireland, Oxford (GB); Vikram Mittal, Cambridge, MA (US)

(73) Assignee: Rolls-Royce plc, London (GB)

( * ) Notice: Subject to any disclaimer, the term of this patent is extended or adjusted under 35 U.S.C. 154(b) by 394 days.

(21) Appl. No.: 11/580,893

(22) Filed: Oct. 16, 2006

(65) Prior Publication Data
US 2009/0274549 A1 Nov. 5, 2009

(30) Foreign Application Priority Data
Oct. 26, 2005 (GB) ................... 0521826.8

(51) Int. Cl.
*F01D 5/14* (2006.01)
(52) U.S. Cl. ...................... 415/115; 416/97 R
(58) Field of Classification Search .............. 415/115; 416/97 R, 97 A, 96 R
See application file for complete search history.

(56) References Cited

U.S. PATENT DOCUMENTS 5,326,224 A 7/1994 Lee et al.
5,370,499 A 12/1994 Lee
7,407,365 B2 * 8/2008 Dodd ......................... 415/115

FOREIGN PATENT DOCUMENTS

| EP | 0 375 175 A1 | 6/1990 |
|----|---|---|
| GB | 2 310 896 A | 9/1997 |
| GB | 2 365 497 A | 2/2002 |
| GB | 2 401 915 A | 11/2004 |
| GB | 2 402 715 A | 12/2004 |
| GB | 2 412 411 A | 9/2005 |
| WO | WO 01/95668 A1 | 12/2001 |

* cited by examiner

*Primary Examiner*—Edward Look
*Assistant Examiner*—Dwayne J White
(74) *Attorney, Agent, or Firm*—Oliff & Berridge, PLC

(57) ABSTRACT

A wall cooling arrangement comprising on one side of a wall a multiplicity of cooling fluid inlet apertures and on the opposite of the wall a multiplicity of cooling fluid exit apertures, and in the body of the wall linking said inlet and exit apertures a network of multiply branched cooling passages. Flow of cooling fluid through a network is controlled by a throat positioned either at or close to the inlet to the passage network or at a location part way through the network, in which case there may be a plurality of inlet apertures feeding through a single throat to a plurality of outlet apertures.

9 Claims, 5 Drawing Sheets

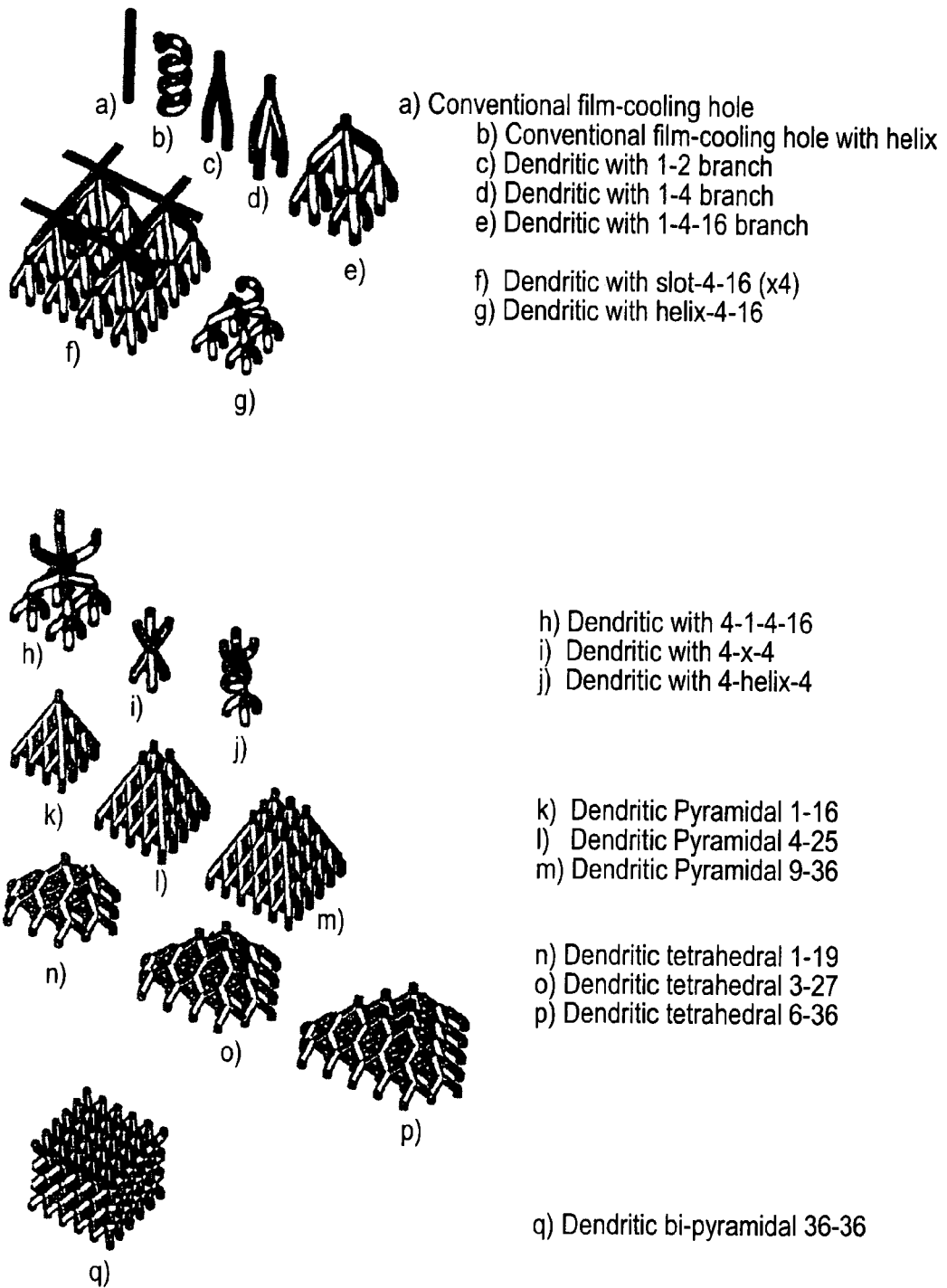

a) Conventional film-cooling hole
b) Conventional film-cooling hole with helix
c) Dendritic with 1-2 branch
d) Dendritic with 1-4 branch
e) Dendritic with 1-4-16 branch f) Dendritic with slot-4-16 (x4)
g) Dendritic with helix-4-16 h) Dendritic with 4-1-4-16
i) Dendritic with 4-x-4
j) Dendritic with 4-helix-4 k) Dendritic Pyramidal 1-16
l) Dendritic Pyramidal 4-25
m) Dendritic Pyramidal 9-36 n) Dendritic tetrahedral 1-19
o) Dendritic tetrahedral 3-27
p) Dendritic tetrahedral 6-36 q) Dendritic bi-pyramidal 36-36

Fig. 6

| | DESCRIPTION | OUTLET-THROTTLE RATIO | NUMBER OF BRANCH STAGES | NUMBER OF INTER-SECTIONS | NUMBER OF HELICES | LOCATION OF THROTTLE | COOLING | FLEXIBILITY | RIGIDITY | COMP-LEXITY | BLOCKAGE |
|---|---|---|---|---|---|---|---|---|---|---|---|
| | | | | | | | \multicolumn{5}{c}{ASSIGNED A NUMBER FROM 1-10 (1 = worse than conventional, 5 = same as conventional, 10 = massive improvement)} | | | | | |
| A | conventional | 1 | 0 | 0 | 0 | n/a | 5 | 5 | 5 | 5 | 5 |
| B | conventional with helix | 1 | 0 | 0 | 1 | n/a | 7 | 7 | 4 | 3 | 5 |
| C | dendritic 1-2 | 2 | 1 | 0 | 0 | inlet | 6 | 3 | 5 | 4 | 4 |
| D | dendritic 1-4 | 4 | 1 | 0 | 0 | inlet | 7 | 3 | 5 | 4 | 4 |
| E | dendritic 1-4-16 | 16 | 2 | 0 | 0 | inlet | 9 | 3 | 4 | 3 | 4 |
| F | dendritic slot-4-16 | 16 | 2 | 0 | 0 | by inlet | 9 | 3 | 5 | 3 | 8 |
| G | dendritic helix-4-16 | 16 | 2 | 0 | 1 | inlet | 9 | 7 | 4 | 2 | 4 |
| H | dendritic 4-1-4-16 | 16 | 3 | 1 | 0 | middle | 10 | 3 | 7 | 2 | 7 |
| I | dendritic with 4-x-4 | 4 | 0 | 0 | 0 | middle | 7 | 3 | 8 | 5 | 7 |
| J | dendritic with 4-helix-4 | 4 | 2 | 8 | 0 | middle | 7 | 7 | 5 | 3 | 7 |
| K | dendritic pyramidal | 16 | 3 | 24 | 0 | inlet | 9 | 4 | 6 | 4 | 4 |
| L | dendritic pyramidal (2x) | 6.25 | 3 | 36 | 0 | inlet | 7 | 3 | 8 | 4 | 7 |
| M | dendritic pyramidal (3x) | 4 | 3 | 5 | 0 | inlet | 7 | 2 | 7 | 4 | 9 |
| N | dendritic tetrahedral (1x) | 19 | 3 | 14 | 0 | inlet | 10 | 4 | 5 | 4 | 4 |
| O | dendritic tetrahedral (2X) | 9 | 3 | 29 | 0 | inlet | 8 | 3 | 7 | 4 | 7 |
| P | dendritic tetrahedral (3X) | 6 | 3 | | 0 | inlet | 7 | 2 | 9 | 4 | 9 |
| Q | dendritic bi-pyramidal | 1 | 0 | 180 | 0 | inlet | 6 | 2 | 10 | 4 | 9 |

Comparison of geometries shown in Figure 6

Fig. 7

WALL COOLING ARRANGEMENT

The invention concerns a wall cooling arrangement. In particular the invention concerns but is not limited to an arrangement of cooling passages for the wall of an aerofoil, especially a turbine blade, of a gas turbine engine.

It is well known that higher operating efficiencies in gas turbine engines can be achieved at higher operating temperatures, and the need to cool the aerofoils at those operating temperatures is well understood and has been widely described.

Gas turbine engines commonly utilise internal fluid cooling systems, usually employing air derived from the engine compressor, to extract heat from the turbine aerofoils, that is the blades and vanes. All fluid cooling systems operate by transferring heat from the blade into a flow of cooling fluid that is constantly refreshed.

Several of the most frequently used systems utilise convective cooling by internal cooling passages formed in component walls, by film cooling by exuding cooling air onto the external heated surface and by impingement cooling using jets of cooling air directed at the internal surface of the heated part. Internal cooling passages usually have as long a path length as possible to assist heat transfer and efficiency may be increased by ribs, turbolators and the like inside cooling passages.

Often internal passage cooling is used in conjunction with film cooling when some of the internal cooling air is bled or exuded into an exterior boundary layer through small holes through the aerofoil walls from the cooling passages. Impingement cooling uses jets of cooling fluid directed against the internal surface of the aerofoil walls. The holes that create these jets are formed either in plates inserted into the blade interior or through internal walls. Serpentine cooling passages, film cooling holes and impingement cooling holes are either cast into the blade structure using soluble core technology or are drilled afterwards for example by laser or chemical means. Consequently the cooling geometry is determined by restrictions on the size of internal core that can be cast or by the limitations inherent in hole drilling externally.

Another system called transpiration cooling also uses a combination of convective and film cooling. The walls of the blade are constructed from a porous material and the cooling air is injected through the pores in the interior surface and flows through the material onto the exterior surface where it forms a boundary surface film. Transpiration cooling can be very effective but the porous material tends to lack structural strength because it is made up a layered sheets of perforate material bonded together.

GB 2412411 described a cooling arrangement employing a combination of convective cooling passages in the body of the aerofoil walls leading to fluid exit holes in the external surface that exude film cooling fluid. The cooling passages are organised in a fractal passage network incorporating several passage stages. Each passage stage has substantially the same passage cross-section for consistency with other passage stages to facilitate flow pressure control across the fractal passage network. Fractal patterns and fractal networks are characterised in that they comprise similar patterns repeated at progressively smaller scales. Fractal cooling networks are prone to blockage problems because the entire system relies on one cooling feed passage. Due to the large number of branches between inlet and outlet a single blockage in an early passage can cause a large region to be starved of cooling flow. Furthermore manufacture is extremely difficult. Casting an aerofoil having a fractal cooling geometry requires a difficult to manufacture ceramic core the outer, final stages of cooling passages of which can easily suffer damage in handling. Such cores are structurally weak and the finer passage cores need external support to avoid sagging or snapping and these supports must be removed before casting can take place.

The present invention seeks to overcome these disadvantages by providing an improved cooling passage structure that can be tailored more closely to local blade cooling requirements, that is the heat extraction capability of a cooling passage arrangement may be closely matched to the distribution of temperatures encountered in use. The invention also seeks to provide a cooling passage structure that can be easily cast using a self-supporting soluble ceramic core strong enough to survive intact and be stable during the casting process.

The invention is not limited to use for cooling gas turbine engine parts, it may find use in wherever there is a requirement to cool internally parts operating at very high temperatures. It is simply that such conditions are to be found in high performance gas turbine engines, especially in rotating turbine components simultaneously subject to extremely high loads and temperatures.

According to the present invention a wall cooling arrangement comprises cooling fluid inlet apertures formed in one surface of the wall, cooling fluid exit apertures formed in the opposite surface of the wall, and between the inlet and exit apertures at least one dendritic structure of fluid carrying cooling passages made up of cascaded pyramidal cooling passage cells in which the number of exit passages in a pyramidal cell is a multiple or a sub-multiple of the number of inlet passages.

Preferably each dendritic passage structure has a passage throat effective in use to restrict the maximum fluid flow rate through the dendritic passage structure. The flow-restricting throat may be situated adjacent a surface of the wall, for example adjacent the inlet aperture surface of the wall, or the exit aperture surface of the wall. Alternatively the throat may be situated mid-way between the inlet and outlet surfaces of the wall.

In a preferred form of the invention a pyramidal cell comprises an inlet passage and at least two outlet passages arranged according to the corners of a pyramid.

The invention and how it may be carried into practice will now be described with reference to the accompanying drawings, in which:

FIGS. 6a-6q compare conventional cooling hole structures a) and b) with a number of dendritic passage structures c)-q).

FIG. 7 contains a table comparing several parameters of the geometries of FIGS. 6a-6q.

Figure 1:
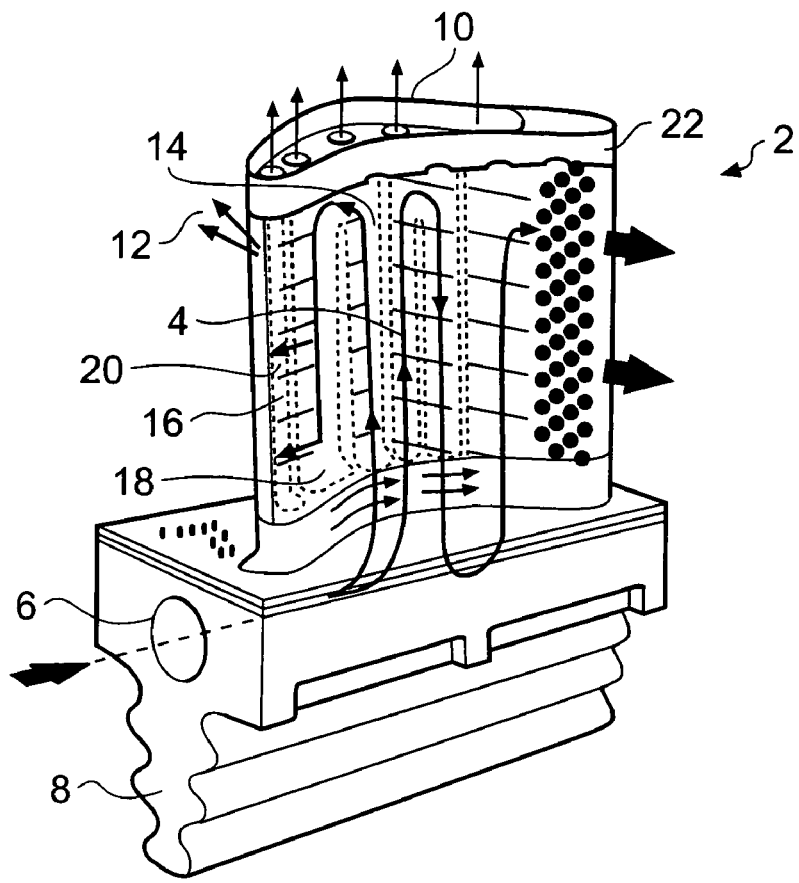
FIG. 1 shows a typical gas turbine engine blade having internal fluid cooling.

Referring now to the drawings FIG. 1 illustrates, in a single drawing, the main cooling strategies commonly currently employed for cooling gas turbine aerofoils. Mainly radial internal cooling passages, joined at their radially inner and outer ends to form serpentine passages, are employed to cool an aerofoil blade, indicated generally at 2, through convective heat transfer. Cooling fluid, in this example air, is fed into internal cooling passages 4 through an inlet aperture 6 in the root 8 of the blade 2 and exhausted through holes 10 at the blade tip or through film-cooling holes 12 spaced apart along the span of the blade. Heat transfer can be enhanced by roughening the internal surfaces of the passages 4 with ribs, dimples, pin-fins or the like, generally indicated at 14. In some known gas turbine engines used for example for land-based power generation the cooling fluid is steam.

The film-cooling holes 12 cool the turbine blade through both convection, by heat transfer to the cooling fluid as it passes through the wall, and film-cooling by means of a boundary layer of cooling fluid exuded onto the external surface of the blade 2 through holes 12. Air is bled from the internal cooling passages 4 and injected through the holes 122 into the boundary layer around the blade 2. The effectiveness of film cooling relies on the film remaining attached to the surface to the surface of the blade 2, at least over the surface region to be cooled.

Impingement cooling uses jets 16 of coolant directed against the internal surface of the blade through thin plates or internal dividing walls 18 perforated by small holes 20. This results in localized high heat transfer from the target surface through an array of stagnation points. However, this geometry weakens the structural strength of the internal load carrying walls, and therefore impingement cooling is primarily used in locations where thermal loads are excessively high.

Figure 2:
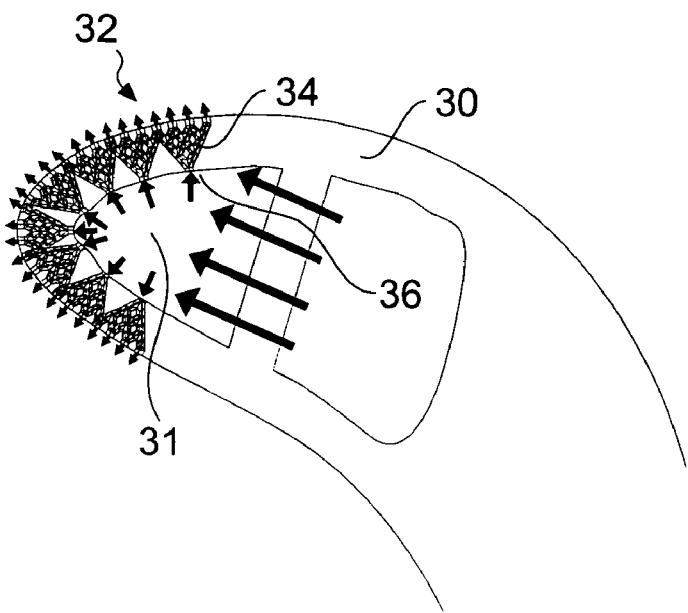
FIG. 2 shows a section through the leading edge of a blade having cooling geometry in accordance with the present invention.

FIG. 2 illustrates a low-blockage transpiration cooling arrangement embodying the present invention applied to the leading edge of a turbine blade generally indicated by reference numeral 32. The cooling passage arrangement is made up of cascaded pyramidal cooling passage cells that produce a dendritic or tree-like structure of cooling passages in the blade wall 30. The arrangement of cooling passages comprises multiply repeated elements of a cooling passage element based on a pyramidal cell or structure of cooling passages. For example, as described in more detail below with reference to the subsequent figures of the drawings, the basic passage cell utilised in the arrangement of FIG. 2 comprises a single inlet passage leading to a junction with four outlet passages. The outlet passages are spaced as at the corners of a square based pyramid in which the inlet is located at the apex of the pyramid. Each dendritic passage structure is then built up from a single inlet by repeated cells in which each outlet from a cell in the first cascade layer feeds into the inlet of another cell in the second cascade layer.

Thus, in the wall cooling arrangement of the blade 32 illustrated in FIG. 2 cooling air is supplied to a cavity 31 behind the blade leading edge. Each one of a plurality of cooling fluid inlet apertures 36 in the inner surface of the wall 30 opens into the inlet passage of a 1 to 4 branch passage pyramid cell. So in the first layer of passage cells each inlet aperture 36 leads to four, intermediate outlet passages, and each of said intermediate outlet passages comprises an inlet passage for another 1 to 4 branch passage pyramid cell in a second cascade layer of cells. In turn, each outlet passage in the second layer forms an inlet passage for a third layer of 1 to 4 branch passage pyramid cells. This cascaded structure of repeated passage cells, commensurate with the dimensions of wall 30, may be repeated as many times as necessary to provide the required level of cooling The dendritic geometry provides higher internal and film-cooling effectiveness than can be achieved using current prior art geometries, described briefly above. The use of branched networks of this kind is normally restricted to regions of an aerofoil where a need for cooling is greatest. Thus, for example, in the case of a high pressure turbine blade it might be used in the region of the leading edge, and from about mid-span towards the blade tip where the highest temperatures are encountered.

Figure 3A:
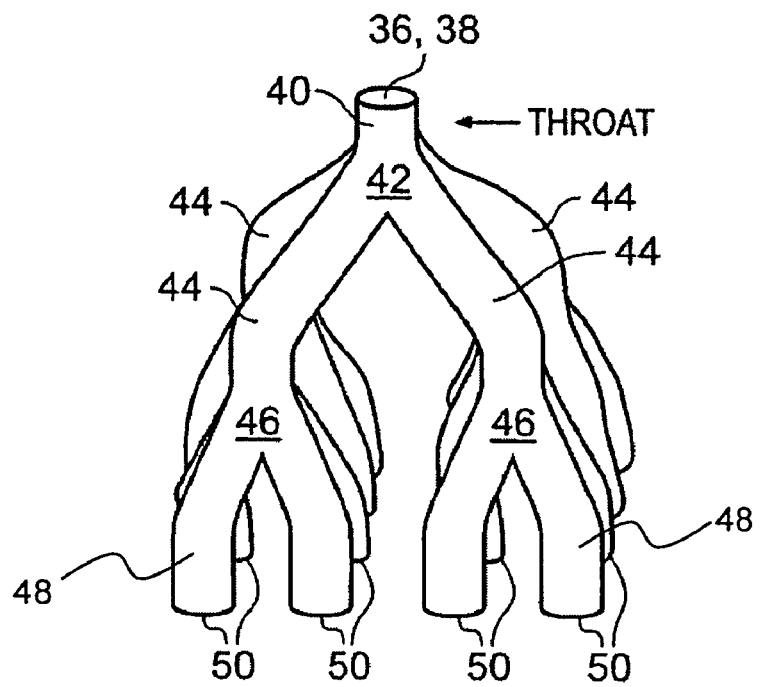
FIGS. 3a and 3b illustrate two versions of a dendritic passage structure for casting an internally cooled blade, wherein a throat passage is located at the inlet and mid-structure locations respectively.

The particular branched geometry network 34 of FIG. 2 is shown in more detail in FIG. 3a. This drawing shows an example of a core used to cast the network of cooling passageways rather than the passageways themselves, but the relationship will be immediately apparent. Therefore in the following description the core will be described by reference to the passageway, or section thereof, produced in a casting by the core. Cooling fluid flow is restricted by the throttling effect of a narrow diameter throat section 38 through which all cooling fluid flow in that network has to pass. In this network 34 the passage throat is produced at the inlet surface of the cast wall (not shown). The throat 38 allows large diameter film-cooling passages to be used for existing pressure margins and coolant flows through similarly sized cooling holes. In the network of FIG. 3a the throat 38 is located at the inlet 36. From inlet, throat 36,38 a passageway 40 proceeds to a first level, four-way branch point 42. From point 42 each of four second level passageways 44 proceed to second level, four-way branch point 46 and from there to third level passageways 48, each of which terminate at an outlet aperture 50. Thus, there are sixteen separate outlets 50 all of which is fed with cooling fluid flow through the throat 42.

Figure 3B:
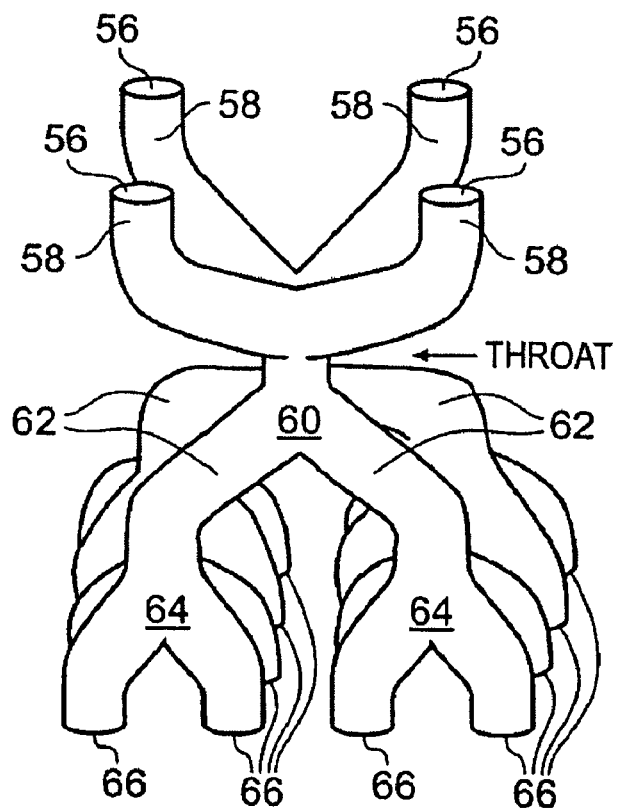

FIG. 3b shows a branched network 52 in which the throat 54 is located below the inlet surface (not shown). In this network 52 there are four separate inlet holes 56, from which four passages 58 converge on a first level to the throat section 54. Immediately after the throat 54 the passageways branch at a second level, four-way branch point 60 into four further passages 62, each of which proceeds to a third level, four-way branch point 64, each of which in turn terminates at a separate outlet aperture 66. Thus, there are sixteen separate outlets 66 all of which is fed with cooling fluid flow through the throat 54

Figure 4:
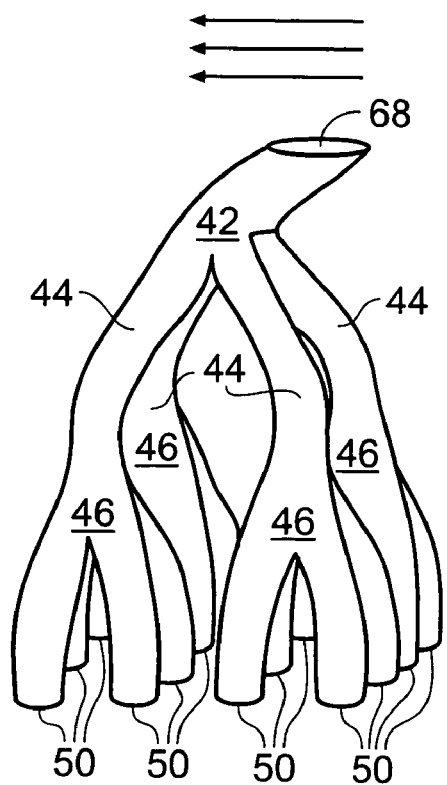
FIG. 4 shows a dendritic passage structure similar to that of FIG. 3a having an angled inlet.

FIG. 4 illustrates a network arrangement that differs from that shown in FIG. 3a by reason that the inlet 68 is angled relative to the inlet surface. The difference will be immediately apparent upon comparison of the drawings of those two Figures in which like parts carry like references.

However, the dendritic geometry of the cores described above cannot be fabricated through the conventional methods used for fabricating blades, that is by investment casting of the basic blade and creating the cooling film holes by electronic discharge or laser machining. The branched structure is inaccessible by these machining techniques and is too complex to be cast in situ using prior art core technology; the cores cold not be manufactured as conventional moulds and anyway would be too fragile to be used unsupported, and the spaces left by removal of such supports could not be filled afterwards. Suitable moulds can now be manufactured by a new, recently developed technique, which uses a variation of a rapid prototyping process to directly fabricate a core embodying the dendritic geometry. This rapid prototyping process employs a ceramic loaded, laser curable resin to build up a core layer by layer. The film-cooling holes also act as supports for the mould walls, and the dendritic geometries can be altered to enhance the structural strength of the mould. Some of the dendritic geometries incorporate helices, increasing the internal convective efficiency of the cast passages and the flexibility of the ceramic core.

Additionally, the aerofoil walls can be thickened with little additional mass due to the large amount of material removed by the dendritic structure. In particular, the internal plenum can be cast to have vertical ribs matched to the shape of the dendrites. Also, if the ribs are cast parallel to the direction of the centrifugal load to which the blade is subjected they will act to strengthen the blade. The dendritic cooling geometry can be coupled with internal convective-cooling passages and impingement cooling to further increase the convective efficiency as shown in FIGS. 3a, 3b and 4.

Traditional film-cooling holes run directly from an inner cavity out onto the blade outer surface. As they run through the passage, the air convectively cools the blade body. By decreasing the coolant mass flow, the convective efficiency increases. As the coolant emerges from the wall it forms a cool layer of gas adjacent to the wall, which reduces the heat, flux from the hot gas cross flow, a process known as film cooling.

By branching out the film-cooling hole in accordance with the presently described invention, the flow is restricted by the throat, the section of the geometry that has the minimum flow area. In the dendritic geometry, a throat is formed by the section that has the least number of passages, as shown in FIGS. 3a, 3b and 4. The throat is normally at the inlet, though it is not required to be there. The mass flow through the throat would typically be governed by the pressure difference between the plenum and the blade wall (typically 10%). By decreasing the mass flow, the convective efficiency increases. Moreover, since the coolant is exiting through multiple closely spaced holes, the coverage area increases. The areas with low film-cooling effectiveness (between the holes in the span-wise direction and far downstream of the hole) decrease with dendritic cooling over traditional film-cooling.

Figure 5:
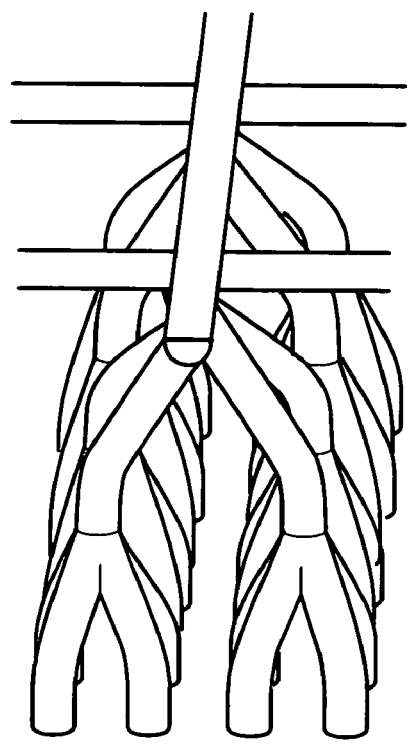
FIG. 5 shows a dendritic passage structure similar to that of FIG. 4 having a slotted inlet.

The method traditionally used for restricting the flow in transpiration cooling is to decrease the hole diameter. For the dendritic system, a throat restricts the mass flow. Therefore, the hole diameters can remain the same as conventional film-cooling holes. Therefore, blockage is no worse with the dendritic geometries than traditional geometries. However, by adding a slot to the inlet, with a width slightly smaller than the hole diameter, blockage can be reduced. The slot acts as a filter, and potential blocking material is caught in the slot, though coolant will be able to enter the geometry through other regions of the slot, as shown in FIG. 5.

As previously mentioned the dendritic geometry cannot be fabricated by conventional methods used for fabricating blades—investment casting and electronic discharge or laser machining. A new technique using a ceramic loaded resin in a rapid prototyping process is employed to directly fabricate a dendritic mould according to the dendritic geometry principles described above. The cores for the film-cooling holes also act as supports for the mould walls that have the effect of strengthening and stabilising the whole core assembly. Dendritic geometries can be altered to increase the structural strength of the mould.

The weakest points in the dendritic structure would be at the inlet and the outlet, where the connections provide the support for the rest of the geometry. Not only must these points support the weight of the structure, but they must also handle stresses caused by shrinkage and warping. While acting as a support, the dendrite must be protected from snapping. Flexibility, especially under compression and tension, is desirable and should increase the survivability of the dendrite core network. Therefore a helix may be included in the core structure. Helices, acting as springs, have a high amount of flexibility, allowing the dendrite to change length without snapping. Additionally, helices increase the heat transfer by increasing the length to diameter ratio.

The dendritic geometry requires a wall thicker than that used by traditional film-cooling geometries, due to the branches. If the wall is thickened to match the contour of the dendrite, and is extended span-wise the effect is to form ribs along the length of the inner wall of a hollow blade body. In addition to providing the wall thickness needed for branching, they also run parallel to the centrifugal loadings placed on the blade, hence strengthening the blade. Moreover, the ribs also roughen the surface to increase heat transfer if coupled with impingement cooling.

FIG. 6 shows a variety of sample geometries. Each is individually tabulated for reference. So, FIG. 6 a) is a conventional rectilinear film-cooling hole, as commonly known in the prior art; FIG. 6 b) is a conventional film cooling hole incorporating a helix; Figure c) shows a dendritic network with 1-2 branch; FIG. 6 d) shows a dendritic network with a 1-4 branch; FIG. 6e) continues the expansion by showing a dendritic network with a 1-4-16 branch. The remaining sections of the drawing referenced f) to q) represent progressively more complex dendritic networks as labelled in the drawing. FIG. 7 contains a table comparing several parameters (advantages and disadvantages) for each variant with each other and with the prior art. It will be appreciated that a basic pyramid passage cell configuration is not restricted to a four-sided pyramid branch structure discussed above. Other possible pyramid structures include three-sided, five-sided and higher order basic cell configurations. The number of final outlet apertures will naturally build more rapidly for any given number of cascaded layers according to the number of branches in each cell. However, the higher the number of branches in each cell the more delicate and susceptible to damage is the dendritic structure. Therefore, in practice, it is unlikely that more than a 1 to 4-branch cell is practicable in most situations involving gas turbine engine blades, but higher order cell structures may find application in other applications of the present invention.

The invention claimed is:

1. A wall cooling arrangement comprising cooling fluid inlet apertures formed in one surface of the wall, cooling fluid exit apertures formed in the opposite surface of the wall, and between the inlet and exit apertures at least one dendritic structure of fluid carrying cooling passages made up of cascaded pyramidal cooling passage cells in which each cell has a number of exit passages being a multiple or a sub-multiple of the number of inlet passages, wherein a diameter of the passages remains substantially constant throughout the dendritic structure.

2. A wall cooling arrangement as claimed in claim 1 wherein and each dendritic passage structure has a passage throat effective in use to restrict the maximum fluid flow rate through the dendritic passage structure.

3. A wall cooling arrangement as claimed in claim 2 wherein the flow-restricting throat is situated adjacent a surface of the wall.

4. A wall cooling arrangement as claimed in claim 3 wherein the flow-restricting throat is situated adjacent the inlet aperture surface of the wall.

5. A wall cooling arrangement as claimed in claim 3 wherein the flow-restricting throat is situated adjacent the exit aperture surface of the wall.

6. A wall cooling arrangement as claimed in claim 3 wherein the throat is situated mid-way between the inlet and outlet surfaces of the wall.

7. A wall cooling arrangement as claimed in claim 1 wherein a pyramidal cell comprises an inlet passage and at least two outlet passages arranged according to the corners of a pyramid.

8. An article having a wall including a wall cooling arrangement comprising cooling fluid inlet apertures formed in one surface of the wall, cooling fluid exit apertures formed in the opposite surface of the wall, and between the inlet and exit apertures at least one dendritic structure of fluid carrying cooling passages made up of cascaded pyramidal cooling passage cells in which each cell has a number of exit passages being a multiple or a sub-multiple of the number of inlet passages, wherein the article is manufactured by an investment casting process in which the dendritic structure of cooling passages is produced by use of a sacrificial core, and wherein a diameter of the passages remains substantially constant throughout the dendritic structure.

9. A sacrificial core in the form of a dendritic structure for use in an investment casting process for manufacturing an article as claimed in claim 8.

* * * * *